Feb. 2, 1965 T. M. ELFVING 3,168,432
CORE MATERIAL
Filed Dec. 22, 1961 3 Sheets-Sheet 2
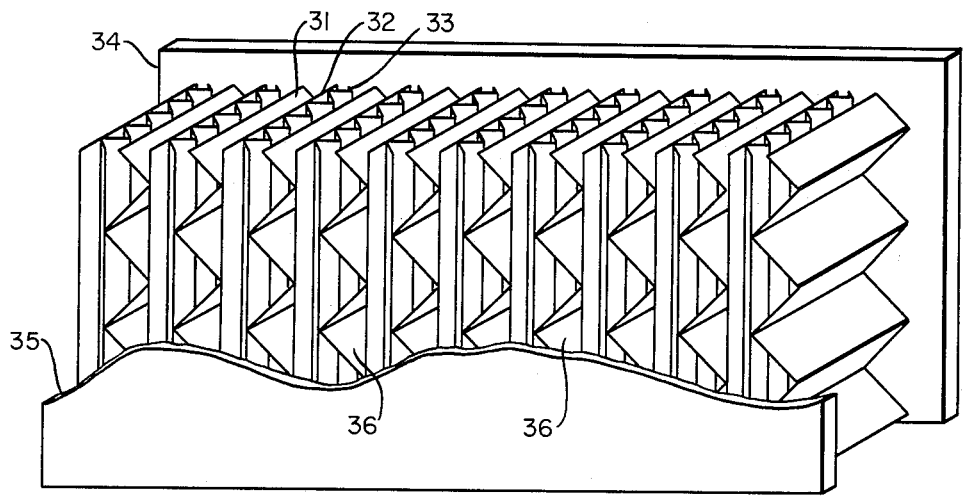
FIG. 3
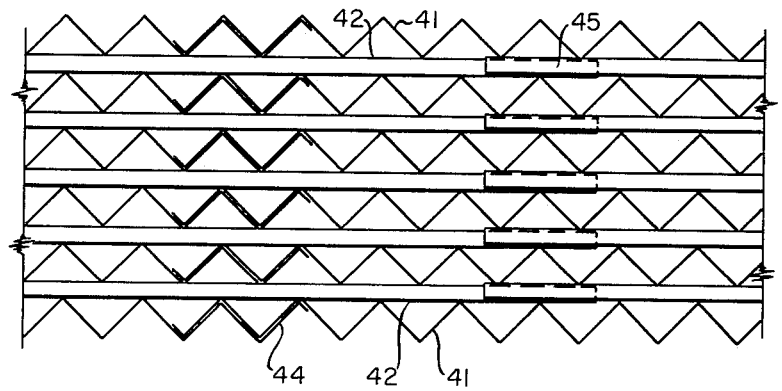
FIG. 4
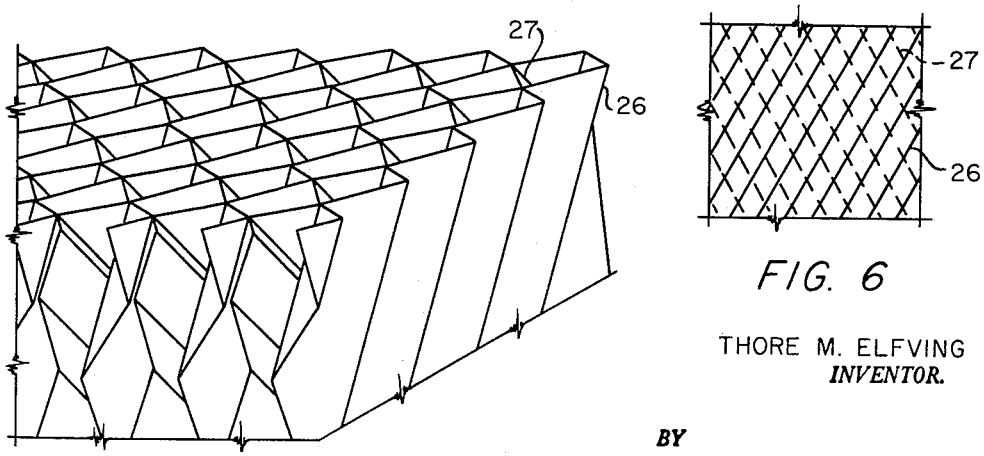
FIG. 5
FIG. 6
THORE M. ELFVING
*INVENTOR.*
BY
ATTORNEYS Feb. 2, 1965  T. M. ELFVING  3,168,432
CORE MATERIAL Filed Dec. 22, 1961  3 Sheets-Sheet 3

THORE M. ELFVING
*INVENTOR.*

BY
*Flehr and Swain*
ATTORNEYS

United States Patent Office 3,168,432
Patented Feb. 2, 1965

3,168,432
CORE MATERIAL
Thore M. Elfving, 433 Fairfax Ave., San Mateo, Calif.
Filed Dec. 22, 1961, Ser. No. 161,627
8 Claims. (Cl. 161—69)

The present invention relates to core materials of the type adapted to be glued or bonded between opposed surfaces of relatively thin sheet material to form a sandwich structure.

Core materials for sandwich structures of the prior art are usually made as a continuous honeycomb structure by various processes. After cutting a core of suitable height, parallel skins are glued to the ends of the honeycomb cells by means of a suitable glue. The most common and economical glues for this purpose contain solvents which escape as a gas during the drying process. Depending upon the glue, the gluing can be carried out with or without the application of heat. When a metal core sandwich is built, the honeycomb cells enclosed between the metal skins form chambers which are hermetically closed off from the outside atmosphere and from each other, provided that the glue lines around the edges of the honeycomb cell are tight on both ends of the cell.

When using a glue which develops gases during the drying process, this structure of closed individual cells cannot be used. The solvent gases cannot escape and, therefore, create pressure which causes the skin to bulge. The result of such bulges in the skins is that a large number of cells do not have their ends bonded to the adjacent skin. This weakens the sandwich structure and makes it substantially impossible to get a smooth and even skin surface.

In order to overcome these difficulties, it has hitherto been usual to perforate the material used to form the honeycomb core so that each cell has at least a few small holes in its walls to enable gases to escape from the inside cells through adjacent cells to the outside. Only by using such a perforated core material, is it possible to apply the skins by means of a glue material containing a solvent. The lamination process for such material requires the application of both substantial pressure and heat in order to shorten the drying process and keep the skins flat in view of the pressure build-up when gas escapes through the small holes.

The perforation also serves to equalize pressure differences between the cells in the sandwich core and the ambient air so that there is no stress or movement as a result of changes in barometric pressure or temperature.

The perforation holes are made very small in order not to weaken the core structure. For this reason, it is practically impossible to provide the perforated foils forming the cells with an anti-corrosive coating since it would fill or cover the perforations. At the same time, it is not practical to perforate the foils after providing them with a protective coating as each perforation would penetrate the coating and each hole be the center of corrosive attack. Perforations with small holes can, therefore, not be combined with an effective anti-corrosive coating treatment for core materials.

Another drawback with the honeycomb cores of the prior art is that they can only be manufactured in strips of limited length. Further, the expanded core cannot be bent without assuming the shape of a saddle. It cannot, for instance, be placed around a cylindrical surface without applying pressure to correct deformity.

It is a general object of the present invention to provide an improved core material.

Another object of the invention is to provide a core material that has a multitude of air channels or pervious ducts so that no groups of closed cells are formed when placed between tight skins in a sandwich structure. The air channels may be placed so that every glue line is ventilated with a direct escape for the evaporating solvent gases from the glue line to the ambient air or to an air stream which can be blown through the structure. A metal core material according to the invention can, therefore, be bonded to impervious metal skins in a sandwich design with the use of considerably less heat and pressure than for ordinary perforated honeycomb cores. A cold or heated air stream passing through the laminated core structure is, in most cases, sufficient to effectively dry the glue while the sandwich is under only moderate pressure.

Another object of the invention is to provide a core material of such configuration that it can be bent closely around a cylindrical surface without the application of pressure.

A further object of the present invention is to provide a core which can be economically produced in strips of almost unlimited length.

Still another object of the present invention is to provide an all metal core structure which is made from non-perforated metal foils provided with an anti-corrosion coating and glued in a sandwich to non-perforated metal skins.

Core structures according to the invention can be made both fully ventilated and semi-ventilated. The fully ventilated structures employ metal foil or sheet materials, preferably aluminum foils, which can be provided with an anti-corrosive coating and be kept intact without perforations. The semi-ventilated structures are used mainly for paper cores which usually are glued to various sandwich skin materials with the application of heat and pressure.

The fully ventilated core structure, according to the invention, can favorably be used also in connection with paper cores and will allow the gluing of sandwich with the use of considerably less heat and pressure than when using honeycomb paper cores whereby the lamination process becomes simpler and more economical.

Referring to the drawings:

FIGURE 3 is a perspective view of a sandwich, partly cut away, incorporating a semi-ventilated core material;

FIGURE 4 illustrates the method of forming a core material of the type shown in FIGURE 2 of any desired length;

FIGURE 5 is a perspective view of another fully ventilated core material;

Figure 7:
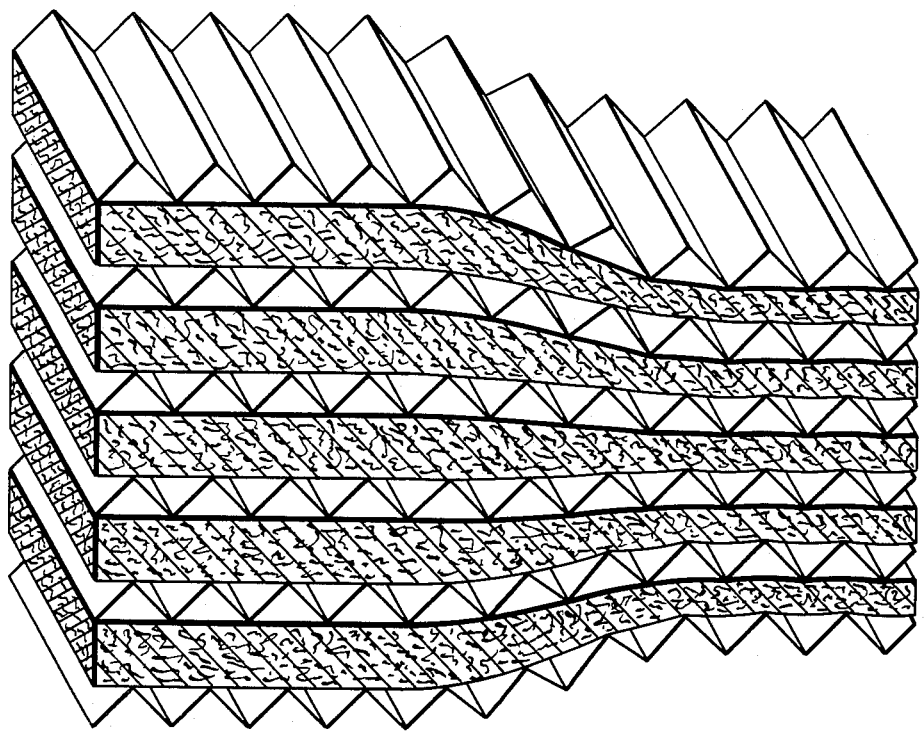

FIGURE 6 schematically illustrates the disposition of the corrugated layers in the core material shown in FIGURE 5; and FIGURE 7 illustrates another ventilated core material in which the load bearing elements are separated by an air pervious compressible blanket material.

Figure 1:
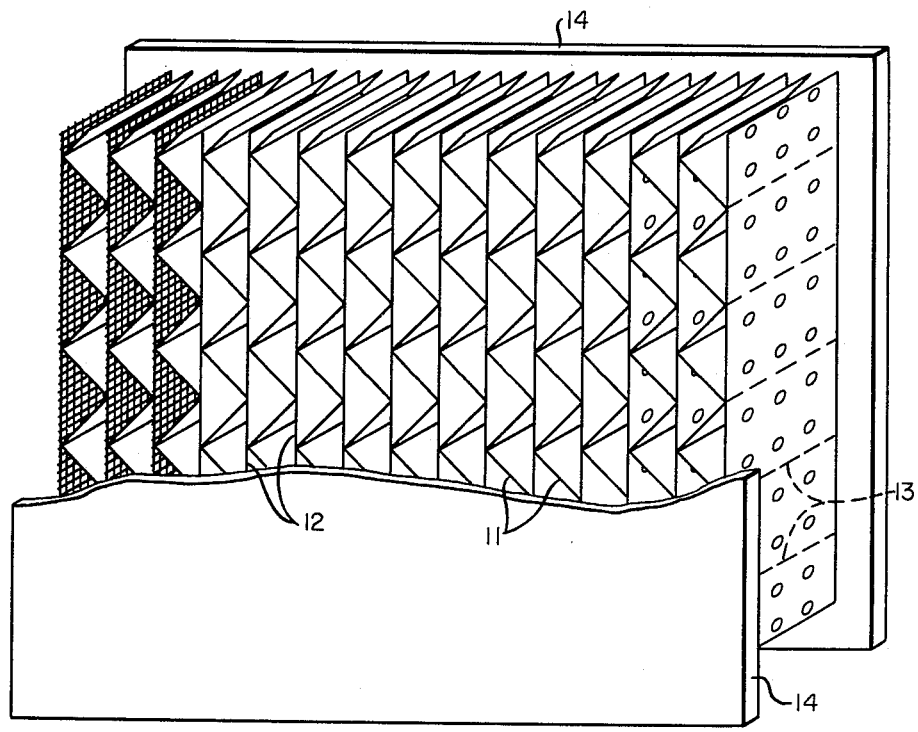
FIGURE 1 is a perspective view of a sandwich, partly cut away, incorporating a ventilated core material.

FIGURE 1 shows a sandwich including core material comprising a multi-layered structure. The core material includes alternate layers of corrugated foil 11 and an inter-connecting flat pervious material 12. The corrugated foils and the inter-connecting flat material are bonded together with a suitable glue along the lines 13 where the top of the corrugations contact the adjacent flat material as indicated by the dotted lines on the drawings.

The core material is manufactured by bonding large sheets of plane inter-connecting material and corrugated foils in alternate layers until they form a stack which is as high as the width of the desired core material. Briefly, the process comprises applying an adhering substance, such as glue, so that it is disposed along the bonding lines 13. Pressure is then applied to maintain the multi-layered structure together with the various layers held in intimate contact, and the stack is passed through a heated drying tunnel with adequate air circulation for drying. After drying, the laminated multi-layered slab is cut to form a core of desired thickness. Preferably, the cut is made in such a way that the corrugations are disposed substantially perpendicular to the ends of the core. The corrugated foils constitute the load bearing part of the core structure. When a sandwich is formed, skins 14, shown on the drawing, are disposed on each side of the core on the ends of the corrugated foils and bonded thereto as, for example, by gluing. A sandwich including a core material according to FIGURE 1 has excellent mechanical properties (compressive strength, sandwich shear strength, and shear modulus) in relation to its weight.

The cells formed between the inter-connecting plane material and load bearing corrugated foils and the sandwich skins are closed gas cells unless the inter-connecting material is pervious or perforated. Suitable pervious inter-connecting materials for ventilating the core structure according to the invention are wire mesh (schematically illustrated on the left of FIGURE 1), asbestos paper of high perviousness, perforated impregnated paper or nylon fabrics, glass textiles and similar pervious material (illustrated on the left of FIGURE 1). With such inter-connecting open or pervious materials in the layer 12, there will be formed zig-zag channels between each two adjacent corrugated foils in which the outside air and gases in any part of the core can freely communicate.

Figure 2:
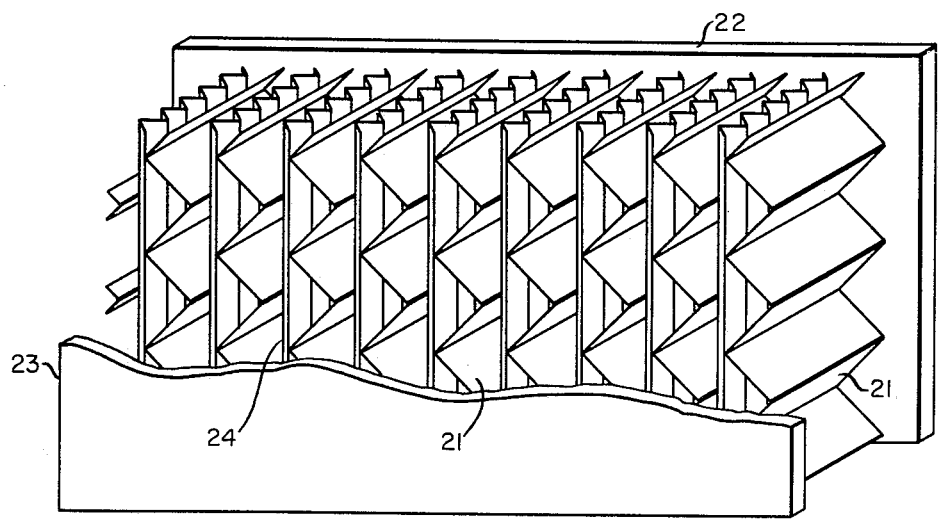
FIGURE 2 is a perspective view of a sandwich, partly cut away, incorporating another embodiment of a fully ventilated core material.

The sandwich structure shown in FIGURE 2 represents another type of ventilated or open core material according to the invention. The comparatively thick corrugated foils 21, substantially perpendicular to the facings 22 and 23, provide mechanical strength similar to the function of the corrugated foil in the core material shown and described with respect to FIGURE 1. However, the structure, rather than including a multi-layered structure with alternate corrugated foils and flat material, includes a multi-layered structure having alternate load bearing corrugated foils 21 and corrugated inter-connecting foils 24 bonded together at the point of contact. The corrugated inter-connecting foils 24 are disposed with the corrugations forming an angle with the corrugations of the load bearing foils 21. As illustrated in FIGURE 2, the inter-connecting foils are disposed with the corrugations at a 90° angle with respect to the corrugations of the supporting foils 21. In essence then, the corrugations are disposed substantially parallel to the skins 22 and 23 forming the sandwich structure. It is apparent that other angles can be used.

The inter-connecting corrugated foils 24 can be made of thinner material than the support foils 21 which provide the mechanical strength. The function of the inter-connecting foils 24, beside inter-connecting and separating the corrugated foils 21, serves to provide air channels in the core so that the glue lines between the sandwich skins and the ends of the corrugated thick foils 21 are completely ventilated to the ambient air. Thus, the core can be made wholly from non-perforated aluminum foils and suitably bonded as, for example, by glue, to aluminum or other impervious skins without any build-up of pressure by the evaporating solvent gases being trapped in the cells. The corrugations of the inter-connecting foils provide both air and drainage channels for the space between adjacent pairs of the thicker foils 21.

Preferably, the inter-connecting foils are disposed with the corrugations in a vertical direction between the sandwich skins when the sandwich is mounted in surroundings which are subject to atmospheric conditions. Any condensation in the core of the sandwich will, therefore, be drained. For this type of application, the core material is preferably built from a foil which includes an anti-corrosive coating. For example, if aluminum forms the core material, the foil may be coated with a vinyl chloride-acetate resin containing 1% maleic acid interpolymerized. A solvent for this resin (VMCH) in powdered form is isopropyl acetate. The lacquer film, after coating, has a "bite" on aluminum and will protect exposed surfaces from corrosion and deterioration. The same lacquer is suitable for gluing the core to the facings in a sandwich structure.

The core material and sandwich design can be given a wide range of compressive and shear strength by varying the thickness of the support foils and the number of such foils per unit width of the core. The number of load bearing foils per inch of core width is determined by the depth of the corrugations of both the load bearing foils and the inter-connecting foils.

A core material of the type shown in FIGURE 2 is manufactured in essentially the same way as the core shown in FIGURE 1. The ventilated core material, according to FIGURE 2, has the corrugations of the load bearing thick foils 21 running perpendicular to the skin surface. The corrugations of the inter-connecting foils 24 run parallel to the skin. In this case, practically all of the compressive strength of the core is contributed by the foils 21.

The corrugations of the inter-connecting foils can, according to the invention, be disposed at other angles relative to the corrugations of the load bearing foils. This is schematically illustrated in FIGURES 5 and 6. The smaller the angle between the corrugations of the load bearing supporting foils 26 and of the inter-connecting foils 27, the more the inter-connecting foils 27 can contribute to the load bearing characteristics of the core. If the angle between the corrugations is very small, say less than 30°, then the inter-connecting foils 27 should preferably be given the same thickness as the load bearing foils 26. It is also favorable in this case to let the corrugations of the foils 26 deviate from the perpendicular position to a position illustrated in FIGURES 5 and 6. There is then provided a fully ventilated core design where all the corrugated foils are of the same thickness, have the same depth of corrugation and all with the corrugations deviating from the perpendicular position with adjacent foils having the corrugations running in an angle of 30° or less to each other. Each layer of foil will then have the same compressive strength. A core material of this type can be manufactured by gluing large sheets of corrugated foils with alternating corrugations at, for instance, a 20° angle. After slicing a core from such a block of foils, all the corrugations will deviate 10° from the perpendicular position with adjacent foils having the corrugations running in an angle of 20° to each other.

A semi-ventilated core design is shown in FIGURE 3. The core structure comprises a corrugated thick foil 31 bonded to a flat foil 32. This combination constitutes the load bearing element of the core comprising a series of triangular cells. The load bearing elements are united by inter-connecting corrugated foils 33. The corrugated foils 33 provide insignificant load bearing qualities but serve as drainage and air channels for the core structure when glued to impervious sandwich skins 34 and 35.

When an aluminum core structure of this type is glued between two impervious skins, the triangular cells 36 formed by the corrugated and flat foil in the load bearing element will be closed. However, the triangular glue lines between the skins and the ends of the closed cells 36 will be fully ventilated in one direction, namely to the air channels formed by the alternating corrugated inter-connecting foils 33. In this way, a certain pressure can be built up in the closed cells with a triangular cross-section, but being single cells, it takes only a pore or a pin hole in the glue line to ventilate the closed cells and the drying action takes place, even if the aluminum foils of the core are non-perforated, without the formation of bubbles or inflation of portions of the skins. A core structure of this type is very strong because of the good section modulus and moment of inertia of the load bearing elements, while at the same time the core structure has practically the same properties as a fully ventilated core and, therefore, can be made of, for instance, non-perforated aluminum foils provided with an anti-corrosion coating.

FIGURE 4 illustrates how practically unlimited lengths of core material can be produced. In the figure is shown how sheets of corrugated foil material 41 and 42 can be laminated to each other with the corrugations crosswise until the stack or block of foils are as high as the desired width of the core strips. The stack starts with a load bearing corrugated foil 41 on top of which is placed an interconnecting corrugated foil 42, followed by a load bearing corrugated foil 41, etc. Before placing the corrugated sheets on each other, they are provided with glue on top of each corrugation. The inter-connecting foils 42 provide the air channels in the core material and are suitably made of a thinner foil material and corrugated to only half the height of the load bearing corrugated foils 41. Load bearing thick foils are in this way alternating with inter-connecting thinner foils.

The corrugated sheets of foil are generally limited in size. However, they can be continued almost infinitely by overlapping the corrugations as illustrated in the drawing, where 44 is a joint of the load bearing foils and 45 a joint of the inter-connecting foils.

FIGURE 7 illustrates another fully ventilated core material where the load bearing elements are separated by a compressible blanket material forming communicating air permeable channels between each two adjacent load bearing corrugated foils. A core material of this type is manufactured by gluing stacks of alternate large sheets of corrugated aluminum foils 51 and a compressible blanket material 52, preferably made from fine glass fiber or similar material. Cores of a suitable height are sliced from such a stack and placed between sandwich skins with the corrugations of the load bearing foils perpendicular to the skins. As illustrated in the lower portion of FIGURE 7, the core can be compressed so that the number of load bearing elements per unit of core width varies according to strength requirements. Sandwich structures of varying strength can in this way be built from a standard core material of the same foil thickness. The core material is flexible in any direction without the introduction of undue distortion.

The core material shown in FIGURES 1, 2 and 3 can be applied to a cylindrical surface without "saddling."

Thus, it is seen that there is provided a relatively inexpensive core material which can be produced in strips of unlimited length. The core material may be bent closely around a cylindrical surface without distortion. The core material is so constructed and arranged that it can be easily glued between spaced skins to provide a sandwich structure having great strength. Furthermore, the construction of the core material is such that it may be coated with anti-corrosive film.

I claim:
1. A sandwich structure of the type including first and second spaced surface members and a core disposed between said surface members in which said core comprises corrugated spaced elements disposed with the corrugations extending generally perpendicular to said surface members, means for securing the ends of said corrugated spaced elements to said surface members, interconnecting elements secured between adjacent corrugated spaced elements to form therewith a composite structure, and means for securing the edge of said interconnecting elements to said spaced surface members, said interconnecting elements cooperating with said corrugated spaced elements to provide communication through said structure between at least one edge and an opposed edge.

2. A core material as in claim 1 wherein the interconnecting elements are made of open flat material.

3. A core material as in claim 1 wherein the interconnecting elements are made of perforated flat material.

4. A core material as in claim 1 wherein the interconnecting elements are made of pervious flat material.

5. A core material as in claim 1 wherein the interconnecting elements are formed of corrugated foil disposed with the corrugations at an angle with respect to the corrugations of the first elements.

6. A core material as in claim 1 wherein said second elements are formed of corrugated foil disposed with the corrugations at substantially right angles with respect to the corrugations of the first element.

7. A core material as in claim 1 wherein the interconnecting elements are formed of compressible blanket material.

8. A sandwich structure as in claim 1 wherein the corrugated spaced elements are secured to a flat sheet to form a structure including a plurality of cells and wherein the interconnecting elements are formed of a corrugated foil contacting the flat sheet of one adjacent cell structure and the corrugated elements of the other adjacent cell structure.

References Cited in the file of this patent
UNITED STATES PATENTS

| | | |
|---|---|---|
| 2,132,642 | Parsons | Oct. 11, 1938 |
| 2,429,508 | Belaieff | Oct. 21, 1947 |
| 2,746,892 | Elfving | May 22, 1956 |
| 2,840,811 | McMillan | June 24, 1958 |
| 2,870,857 | Goldstein | Jan. 27, 1959 |